US005304242A

United States Patent [19]

Taylor

[11] Patent Number: 5,304,242

[45] Date of Patent: Apr. 19, 1994

[54] COLOUR DEVELOPER COMPOSITION

[75] Inventor: David J. Taylor, Monks Risborough, England

[73] Assignee: The Wiggins Teape Group Limited, Basingstoke, England

[21] Appl. No.: 882,555

[22] Filed: May 13, 1992

[30] Foreign Application Priority Data

May 16, 1991 [GB] United Kingdom ................. 9110608

[51] Int. Cl.[5] ................................ C09D 11/00

[52] U.S. Cl. ................................ 106/483; 106/21 A; 106/481; 106/482

[58] Field of Search .............. 106/21 A, 404, 481–483

[56] References Cited

U.S. PATENT DOCUMENTS

| | | | |
|---|---|---|---|
| 2,702,765 | 2/1955 | Steinhardt | 117/155 |
| 2,730,456 | 1/1956 | Green et al. | 117/36 |
| 2,730,457 | 1/1956 | Green et al. | 117/36 |
| 2,757,085 | 7/1956 | Paquin | 92/21 |
| 2,800,457 | 7/1957 | Green et al. | 252/316 |
| 2,800,458 | 7/1957 | Green | 252/316 |
| 3,041,289 | 6/1962 | Katchen et al. | 252/316 |
| 3,223,546 | 12/1965 | Hemstock | 106/288 |
| 3,226,252 | 12/1965 | Hemstock | 117/155 |
| 3,330,722 | 7/1967 | Amano et al. | 162/181 |
| 3,565,653 | 2/1971 | Hemstock et al. | 106/288 |
| 3,736,285 | 5/1973 | Miller | 160/29.6 R |
| 3,980,492 | 9/1976 | Thompson | 106/308 N |
| 4,001,140 | 1/1977 | Foris et al. | 252/316 |
| 4,022,735 | 5/1977 | Thompson | 260/29.7 W |
| 4,038,097 | 7/1977 | Traxler et al. | 106/288 B |
| 4,105,823 | 8/1978 | Hasler et al. | 428/307 |
| 4,109,048 | 8/1978 | Dessauer et al. | 428/325 |
| 4,218,504 | 8/1980 | Yamato et al. | 428/207 |
| 4,289,806 | 9/1981 | Sato et al. | 427/150 |
| 4,387,117 | 6/1983 | Shanton | 427/150 |
| 4,391,850 | 7/1983 | Shanton | 427/150 |
| 4,435,004 | 3/1984 | Shanton | 282/27.5 |
| 4,458,922 | 7/1984 | Shanton | 346/225 |
| 4,509,065 | 4/1985 | Shanton | 346/225 |

FOREIGN PATENT DOCUMENTS

| | | |
|---|---|---|
| 0434306 | 6/1991 | European Pat. Off. . |
| 666437 | 2/1952 | United Kingdom . |
| 1271304 | 4/1972 | United Kingdom . |
| 1307319 | 2/1973 | United Kingdom . |
| 1451982 | 10/1976 | United Kingdom . |
| 1467003 | 3/1977 | United Kingdom . |
| 1497663 | 1/1978 | United Kingdom . |

*Primary Examiner*—Mark L. Bell
*Assistant Examiner*—Willie Thompson
*Attorney, Agent, or Firm*—Burns, Doane, Swecker & Mathis

[57] ABSTRACT

A colour developing composition for use in pressure-sensitive (carbonless) copying paper sets comprises an inorganic pigment extender (e.g. kaolin, talc or calcined kaolin) and a hydrated silica/hydrated alumina composite. The composition is produced by precipitating the hydrated silica/hydrated alumina composite in the presence of the extender by the following steps:

a) gradually adding a metal silicate solution to a solution of an aluminium salt which is initially at a pH below 4 until the pH of the resulting mixture is approximately 4, thereby to induce some precipitation and to form a sol;
b) gradually adding alkali to said sol to raise the pH to approximately 7, thereby to induce further precipitation and gel the sol or further gel the sol, said gelled sol being a hydrated silica/hydrated alumina composite;
c) separating the resulting product from the aqueous medium and washing to remove dissolved salts; and
d) drying the washed product and reducing it in particle size.

18 Claims, No Drawings

COLOUR DEVELOPER COMPOSITION

This invention relates to a process for the production of a colour developer composition having a hydrated silica/hydrated alumina composite as an active colour developing ingredient. The colour developer composition is primarily intended for use in record materials forming part of pressure-sensitive record sets (or carbonless copying paper as such sets are more usually known).

A colour developer composition, as is well-known in the art, is a composition which gives rise to a coloured species on contact with a colourless solution of a chromogenic material (such chromogenic materials are also called colour formers) .

Pressure-sensitive record sets may be of various types. The commonest, known as the transfer type, comprises an upper sheet (hereafter referred to as a CB or coated back sheet), coated on its lower surface with microcapsules containing a solution in an oil solvent of at least one chromogenic material and a lower sheet (hereinafter referred to as a CF or coated front sheet) coated on its upper surface with a colour developer composition. If more than one copy is required, one or more intermediate sheets (hereafter ref erred to as CFB or coated front and back sheets) are provided, each of which is coated on its lower surf ace with microcapsules and on its upper surface with colour developer composition. Pressure exerted on the sheets by writing, typing or other imaging pressure ruptures the microcapsules thereby releasing chromogenic material solution on to the colour developer composition and giving rise to a chemical reaction which developes the colour of the chromogenic material and so produces an image.

In another type of pressure-sensitive record set, known as the self-contained or autogeneous type, both the microcapsules containing the chromogenic material and the colour developer composition are present in juxtaposition in or on the same sheet.

Such pressure-sensitive record sets have been widely disclosed in the patent literature. For example, transfer sets are described in U.S. Pat. No. 2730456, and selfcontained sets are described in U.S. Pat. No. 2730457.

The use of silica/alumina materials as colour developers has been proposed in UK Patent No. 1467003 and in European Patent Applications Nos. 42265 A and 42266 A.

UK Patent No. 1467003 is particularly concerned with the use as colour developers of amorphous silica/alumina mixtures derived from petroleum cracking catalysts. No details of the processes used to prepare the catalysts are disclosed. The patent does however disclose the preparation of a sample of silica/alumina by reacting an aluminium sulphate solution with aqueous sodium silicate, but no details beyond this are disclosed.

European Patent Applications Nos. 42265 A and 42266 A are concerned with amorphous hydrated silica/hydrated alumina composites, and numerous examples of methods for the preparation of such composites are disclosed. These include the deposition of hydrated alumina on to previously precipitated hydrated silica, and the preparation of the hydrated silica/hydrated alumina composite in situ from aluminium and silicate salts, e.g. aluminium sulphate and sodium silicate. The preparation of hydrated silica/hydrated alumina composites using aluminate salts is also disclosed. The in situ preparative techniques disclosed include (a) the use of a reaction mixture which is initially alkaline and is lowered in pH to produce the desired composite and (b) the initial acidification of a silicate solution to pH7, followed by addition of aluminium sulphate solution and raising the pH with alkali.

A problem which may be encountered when making hydrated silica/hydrated alumina composites as disclosed in European Patent Applications Nos. 42265 A and 42266 A is that sudden severe viscosity increases, or even gelling, may occur at certain stages of the process. This may be countered to some extent by adding dilution water at the start of, or during, the process, but this results in a lower solids content product, which is disadvantageous. A further problem is that flocs may form in the composite product, which tends to lead to "dusting" of the coating in the eventual coated record material product. This dusting can be countered to a certain extent by raising the binder level, but this carries a penalty in that the reactivity, i.e. colour developing effect, of the record material is lessened.

European Patent Application No. 81341 A is concerned with the use as colour developers of composites of hydrated zirconia and, inter alia, hydrated silica and hydrated alumina. A variety of preparative routes for making hydrated zirconia/hydrated silica/hydrated alumina composites is disclosed, including a process in which an aqueous mixture of a zirconium salt, aluminium sulphate and sodium silicate is produced at a pH below 4.0 and the pH of the mixture is then raised to 7.0 to produce the hydrated zirconia/hydrated silica/hydrated alumina composite. The hydrated zirconia content of the composite is 20%, 33% or 60% by weight.

European Patent Application No. 434306 A seeks to provide hydrated silica/hydrated alumina composites which exhibit improved performance (including improved printability performance) , improved product uniformity, improved ease of manufacture and/or improved ease of utilisation compared with those disclosed in European Patent Applications Nos. 42265 A and 42266 A. The composites of European Patent Application No. 90313591 are prepared by raising the pH of an initially acid reaction mixture rather than by lowering the pH of an initially alkaline reaction mixture as is disclosed in European Patent Applications Nos. 42265 A and 42266 A.

More specifically, European Patent Application No. 434306A discloses a process for the production of record material carrying a colour developer composition incorporating a hydrated silica/hydrated alumina composite in which hydrated silica predominates, in which process the composite is precipitated from an aqueous medium containing a solution of a metal silicate and an aluminium salt, and a coating composition incorporating the precipitated composite is formulated and then applied to a substrate which is subsequently dried to produce said record material, the process being characterized by the steps of:

a) gradually adding a metal silicate solution to a solution of an aluminium salt which is initially at a pH below 4 until the pH of the resulting mixture is approximately 4, thereby to induce some precipitation and to form a sol;
b) gradually adding alkali to said sol to raise the pH to approximately 7, thereby to induce further precipitation and gel the sol or further gel the sol, said gelled sol being a hydrated silica/hydrated alumina composite;

c) separating the gel from the aqueous medium and washing the resulting product to remove dissolved salts; and d) drying the washed product and reducing it in particle size before formulation into said coating composition, In general, when formulating colour developer compositions for use in commercial production of CF and CFB papers as described above, it is conventional to admix the active colour developing material with an inert or relatively inert extender such as kaolin or calcium carbonate. This conventional practice would apply to hydrated silica/hydrated alumina composite colour developer materials just as it does to other types of colour developer material.

It has now been found that significant benefits can be obtained with colour developer formulations based on the hydrated silica/hydrated alumina composites of European Patent Application No. 434306 A if the inert or relatively inert pigment extender is present in slurry form during the formation of the hydrated silica/hydrated alumina composite, rather than being admixed with the composite after its formation. These benefits are principally improved colour developing performance and ease of production of the colour developing composite itself.

Accordingly, the present invention provides a process for the production of a colour developer composition comprising both a hydrated silica/hydrated alumina composite in which hydrated silica predominates and an inorganic pigment extender, said process comprising the steps of:

a) gradually adding a metal silicate solution to a solution of an aluminium salt which is initially at a pH below 4 until the pH of the resulting mixture is approximately 4, thereby to induce some precipitation and to form a sol;

b) gradually adding alkali to said sol to raise the pH to approximately 7, thereby to induce further precipitation and gel the sol or further gel the sol, said gelled sol being a hydrated silica/hydrated alumina composite;

c) separating the resulting product from the aqueous medium and washing to remove dissolved salts; and d) drying the washed product and reducing it in particle size;

and said process being characterized in that the inorganic pigment extender is present during precipitation of the hydrated silica/hydrated alumina composite from the metal silicate and aluminium salt precursor solutions and forms part of the product which is subsequently separated, washed, dried and reduced in particle size.

The present invention also extends to the use of the resulting colour developing composition in record material for use in pressure-sensitive record sets.

The above-mentioned improved colour developing performance of the present colour developing composition compared with an otherwise comparable admixture is demonstrated by the data in Example 1 set out hereafter.

The above-mentioned benefits in relation to the production of the colour developing composite are principally lower process viscosities and reduced energy and time requirements for the particle size reduction stage of step (d) of the process. The lower process viscosities enable the process to be operated at a higher solids content, and hence to produce increase batch yields from a plant of given size. A further advantage is that removal of dissolved salts is also made easier or more effective in some cases.

The reasons why these benefits are obtained are not fully understood, but it is thought that the extender particles "seed" the precipitation and so lead to the hydrated silica/hydrated alumina composite being deposited on to the surface of the extender as sub-micron size particles.

These have a large total external surface area and this leads to very effective colour development. By contrast, if the extender is not present, the initially small precipitated hydrated silica/hydrated alumina composite particles aggregate together to form much larger particles, with a correspondingly lower total external surface area. The differences just described are also thought to explain the reduced energy and time required f or particle size reduction. Thus particle size reduction of composite when it is individually deposited on to pre-existing extender particles involves primarily the separation of coated extender particles. In contrast, when no extender is used, the process involves the breaking up of large precipitated particles, which requires much more energy and time.

Kaolin is the preferred inorganic pigment extender for reasons of cheapness and availability. The other widelyused conventional extender, calcium carbonate, is not well suited to the acid process conditions prevailing in step (a) and at the beginning of step (b) of the process and would thus not normally be used. Other acid-insensitive inorganic pigments such as talc or calcined kaolin could be used, either with kaolin or on their own (calcined kaolin does itself have significant colour developing properties) .

In a preferred embodiment of the process, the gelled sol/ extender mixture produced in step (b) above is subjected to a hydrothermal treatment before being separated and washed as specified in step (c) above. The hydrothermal treatment, which is essentially a hot water ageing process, typically involves raising the temperature of the gelled sol, e.g. by steam heating, and maintaining this elevated temperature for a few hours. By way of example, hydrothermal treatment might take place at 100° C. for up to four or five hours. If temperatures lower than 100° C. are employed, a longer period of hydrothermal treatment is generally required to achieve an equivalent effect.

Temperatures higher than 100° C. can be used if pressurized reactor vessels are employed. The use of temperatures higher than 100° C. can be advantageous in that it reduces the time required for the hydrothermal treatment. For example, at a temperature of 140° C., hydrothermal treatment for only 30 minutes is normally adequate. However these benefits may be negated by the additional cost of a pressurized reactor vessel.

In carrying out the present process, the extender pigment is typically slurried in water and thoroughly dispersed before aluminium salt is added. The aluminium salt used is preferably aluminium sulphate, typically at about 25% solids content. The already acidic pH of the aluminium salt solution may be adjusted, if desired, to an even lower pH by the addition of an acid, for example 35% sulphuric acid (by weight), but it is found that this is generally unnecessary when extender pigment is present.

The metal silicate solution which is then slowly added, usually after a period of stirring, is preferably sodium silicate, typically supplied at about 40% to 50% solids content, but then diluted to about 20% to 25% solids content. Other silicates could be used instead of sodium silicate, for example potassium silicate.

The alkali used for raising the pH in step (b) is preferably sodium hydroxide, for example 10 N sodium hydroxide.

Separation of the gel/extender mixture from the aqueous medium is conveniently done by filtration, for example in a standard plate filter press at high pressure, for example 2 MPa (20 Bar). The degree of subsequent washing of the separated gel/extender mixture is determined partly by reference to the technical performance of the product, and partly by economic factors. Whilst washing until substantially all dissolved salts have been removed gives the best technical performance, prolonged washing carries with it a cost penalty, and a compromise between cost and technical benefit may be necessary. Conductivity measurements on the wash water provide a convenient means of monitoring the extent of removal of dissolved salts. Removal of substantially all dissolved salts is typically indicated by a wash-water conductivity of 500 to 1000 $\mu S\ cm^{-1}$ ($\mu S$=micro-Siemens), although this depends to some extent on the hardness or purity of the water used for washing.

The washed filter cake typically has a solids content of about 25 to 30% w/w and can be broken up by passing through a mechanical breaker, after which it is ready for drying. This can be carried out, for example, using a fluidized bed dryer, for example with inlet and exhaust temperatures of 130° C. and 60° C. respectively. The dryer is preferably arranged to shut down automatically when a predetermined exhaust temperature is reached, this temperature being indicative of the desired product dryness having been reached. Drying is typically carried out so as to give a final dried product having a residual moisture content of up to about 10%, preferably 3 to 7%, by weight.

Reduction of the particle size of the composition can be achieved, for example, by an initial dry grinding step in a hammer mill to a particle size such that 95% of particles are of a size below 100 $\mu$gm, followed by slurrying and ball mill treatment, typically to a median particle size of about 2 to 4 $\mu$m, preferably 3 to 4 $\mu$m (as measured by a laser light scattering particle size analyser).

The B.E.T. surface area of the colour developer composition after drying and reduction of particle size is typically up to 300 $m^2\ g^{-1}$.

The resulting reduced particle size product may be dried, e.g. for bagging, or may be stored in a tank as a slurry of, say, 45% solids content, prior to formulation into a coating composition and coating on to a suitable substrate with one or more binders, for example styrene-butadiene or another latex, and/or carboxymethylcellulose (CMC). Additional extender pigment may be added at this stage if desired, for example additional kaolin and/or calcium carbonate.

The substrate to which the present colour developer composition is applied is conveniently of paper as conventionally used in pressure-sensitive record material, i.e. of a thickness of about 60 to 90 microns and a grammage of about 35 to 90 $g\ m^{-2}$.

The alumina content of the composite may if desired be increased by a secondary precipitation of alumina on to a hydrated silica produced as defined in steps (a) to (d) of the present process. This can enhance the fade resistance of the colour developed in use, but the benefit obtained has to be balanced against the additional process cost involved. The present hydrated silica/hydrated alumina composite can, if desired, be used in admixture with conventional colour developers, particularly acid clay colour developers such as acid-washed dioctahedral montmorillonite clays.

The hydrated silica/hydrated alumina composite may if desired be modified by the presence of relatively small amounts (normally not more than about 10% by weight, and preferably well below this level) of other hydrated metal oxides, for example zinc, copper, nickel, zirconium, or any of the other metals disclosed in European Patent Applications 42265 A, 42266 A or 434306 A. Such hydrated metal oxides are conveniently precipitated on to previouslyformed hydrated silica/hydrated alumina composite or are coprecipitated from the metal salt solution during the formation of the hydrated silica/hydrated alumina composite.

When the metal silicate solution is added gradually to the aluminium sulphate solution, so as to raise the pH from an initial value of about 3.2 to a final value of, say, 4.0, a certain amount of precipitation occurs and the result is a metastable sol of relatively low viscosity. Whilst there is an increase in viscosity as the pH is raised from 1.0 to 4.0, this viscosity increase is manageable, and can be handled by strong stirring. On gradual addition of alkali to raise the pH to 7, gelling occurs. Thus it is normally necessary to add dilution water before pumping the gel to a filter press or other separating apparatus. On drying of the filtered and washed gel, the initial gel structure collapses and is converted from a hydrogel to a more dense xerogel.

Hydrothermal treatment of the gel prior to drying results in the gel being converted to a more robust material by the cementing together of the primary particles which make up the gel. The degree of cementing which occurs is determined primarily by the duration and temperature of the hydrothermal treatment.

The alumina content of the hydrated silica/hydrated alumina composite and the use of hydrothermal treatment significantly influences the properties of the final composite. This is best illustrated by reference to a precipitated product having zero alumina content (i.e. pure silica) made in a manner analogous to that used to produce the present hydrated silica/hydrated alumina composite, i.e. by precipitation of silica by gradual addition of metal silicate solution on to an aqueous acid medium initially at a pH below 4 and then raising the pH by addition of alkali. Such a pure silica product has good colour development properties, but the colour produced fades rapidly, and high viscosity or gelling is a problem.

When the composite includes a relatively low level of alumina, say up to about 6% and is produced as described in steps (a) and (b) of the present process as defined above, the viscosity of the final product is easier to control, and fade resistance is improved (changes in fade resistance depend not only upon alumina content but also on the physics-chemical structure of the composite—thus the statement that the inclusion of a relatively low level of alumina leads to improved fade resistance is predicated on there being no significant change in physics-chemical structure which might distort the comparison).

If the alumina level of the composite is above a certain critical threshold, typically about 6% alumina, it is found that on drying its structure collapses and the mean pore size falls dramatically. This results in much worse colour developer performance.

Hydrothermal treatment has the effect of preventing or inhibiting this structural collapse of the composite on drying and leading to a final product of higher pore volume and surface area. As a result of hydrothermal treatment, the loss of developer performance otherwise experienced at alumina levels above about 6% is avoided. Thus the net effect of hydrothermally treating a high alumina content material (say above about 10% alumina) is both good colour developer performance and good fade resistance. It has also been found that hydrothermally treated products have acceptable rheological properties, even though they have somewhat higher viscosities than an otherwise similar product which has not been hydrothermally treated.

Taking the various factors discussed above into account, the optimum alumina content of the composite is considered to be in the range 10% to 30%, with an alumina content of about 20% currently being preferred.

In the above comments, and in the remainder of this specification, references to alumina content are to the alumina content on a dry basis based on the total dry weight of silica and alumina.

The present record material may be uncoated on its surface opposite to that to which the colour developer composition is applied, or may have a microencapsulated chromogenic material solution on that surface.

When a microencapsulated chromogenic material solution is present, the microcapsules may be produced, for example, by coacervation of gelatin and one or more other polymers, e.g. as described in U.S. Pat. Nos. 2800457; 2800458; or 3041289; or by in situ polymerisation of polymer precursor material, e.g. as decribed in U.S. Pat. Nos. 4001140; and 4105823. The chromogenic materials used in the microcapsules may be, for example, phthalide derivatives, such as 3,3-bis(4-dimethylaminophenyl)-6-dimethylaminophthalide (CVL) and 3,3-bis(1-octyl-2-methylindol-3-yl)phthalide, or fluoran derivatives, such as 2'-anilino-6'-diethylamino-3'-methylfluoran, 6'-dimethylamino-2'-(N-ethyl-N-phenylamino-4'-methylfluoran), or 3'-chloro-6'-cyclohexylaminofluoran. The solvents used to dissolve the chromogenic materials may be, for example, partially hydrogenated terphenyls, alkyl naphthalenes, diarylmethane derivatives, dibenzyl benzene derivatives, alkyl benzenes or biphenyl derivatives, optionally mixed with diluents or extenders such as kerosene.

The invention will now be illustrated by the following Examples, in which all percentages are by weight.

EXAMPLE 1

This illustrates the production of the present colour developer compositions at a range of different relative proportions of hydrated silica/hydrated alumina composite and extender pigment (kaolin), and compares the colour developer performance obtained in each case with those obtained using an admixture of the same amounts of extender pigment and previously-produced hydrated silica/hydrated alumina composite. A generalised procedure is given first, and the specific quantities of materials used for each individual run are detailed later.

A g of kaolin ('SPS' supplied at 99% solids content by English china Clays Ltd. of St. Austell, England) was slurried with B g water, and the slurry was stirred for 20 minutes to ensure that the kaolin was fully-dispersed. C g of 27% aluminium sulphate solution were added, and the mixture was stirred for a further 10 minutes. D g of 20% sodium silicate solution were then added slowly over a period of 15 minutes. The 20% sodium silicate solution had previously been prepared by diluting 40% sodium silicate solution ("P8411" supplied by ICI and having an $Na_2O:SiO_2$ ratio of 1:3.2) with an equal amount of water to produce a solution of 20% concentration.

It was observed that some precipitation and sol formation occurred as the sodium silicate solution was added, and that the viscosity of the mixture increased significantly. This increase in viscosity did not exceed manageable limits.

The pH of the mixture on completion of the sodium silicate addition was approximately 4. This was then raised by gradual addition of sodium hydroxide solution until a stable pH of approximately 7 was reached (this took approximately 10 minutes). This resulted in further precipitation and in gelling of the sol.

The resulting mixture was then hydrothermally treated by heating to 100° C. and maintaining at this temperature for approximately 4 hours. The solid material was filtered off and washed to remove dissolved salts (as indicated by washwater conductivity measurement as described earlier). The washed product was then dried, and dry milled by means of a fluid-energy mill. The mean particle size after milling was in the range 2.7 to 3.5 microns in each case, as determined by light scattering particle size analysis.

The quantities of materials used were chosen such as to give hydrated silica/hydrated alumina composite levels of 10%, 20%, 30%, 40% and 50%, based on the total weight of composite and extender pigment. The actual quantities used (in g) were as shown in Table 1a below, and in each case resulted in production of 330 g of washed dry colour developer composition. The alumina content of the hydrated silica/hydrated alumina composite component of the composition was 20% in each case, based on the total weight of hydrated alumina and hydrated silica.

TABLE 1a

| | % Composite | | | | |
|---|---|---|---|---|---|
| | 10 | 20 | 30 | 40 | 50 |
| A | 300 | 264 | 231 | 198 | 165 |
| B | 700 | 616 | 539 | 462 | 385 |
| C | 83 | 165 | 248 | 330 | 413 |
| D | 175 | 346 | 520 | 693 | 866 |

The above procedure was also repeated without kaolin being present, in order to provide a control when the resulting hydrated silica/hydrated alumina composite had been admixed with A g of kaolin.

Each colour developer composition obtained was made up into a 48% solids content slurry with water. 425 g of this slurry were then mixed with 75 g of styrene-butadiene latex binder ("Dow 62011" latex, supplied by Dow Chemical at 50% solids content) to form a coating composition with approximately 17.9% latex content (dry) based on the total dry weight of inorganic material. The pH of each composition was adjusted to 8.8 using sodium hydroxide solution before adding the latex.

Control coating compositions were prepared by slurrying appropriate amounts of control hydrated silica/-hydrated alumina composite and kaolin to give a 48% solids slurry, adjusting the pH as described above, and then mixing with latex.

The various coating compositions were coated on to base paper at a nominal coatweight of 8 g $m^{-2}$ by means of a laboratory coater, and then dried. The base paper was as typically used in production of carbonless copying paper. The colour developer properties of the resulting papers were then evaluated by the so-called calender intensity (C.I.) test conventional in the art. A fade test was also carried out.

The calender intensity test involved superimposing strips of paper coated with encapsulated colour former solution (CB paper) onto a strip of the coated paper under test, passing the superimposed strips through a laboratory calender to rupture the capsules and thereby produce a colour on the test strip, measuring the reflectance of the thus coloured strip (I) and expressing the result ($I/I_o$) as a percentage of the reflectance of an unused control strip ($I_O$) . thus the lower the calender intensity value ($I/I_o$) the more intense the developed colour.

The calender intensity tests were done with two different commercially available CB papers, designated hereafter as Papers A and B, which employed different colour former blends.

The reflectance measurements were done both two minutes after calendering and forty-eight hours after calendering, the sample being kept in the dark in the interim. The colour developed after two minutes is primarily due to rapid-developing colour formers in the colour former blend, whereas the colour after forty-eight hours derives also from slow-developing colour formers in the blend (fading of the colour from the rapid-developing colour formers also influences the intensity achieved).

The fade test involved positioning the developed strips from the C.I. tests (after forty-eight hours development) in a cabinet in which were an array of daylight fluorescent striplamps. This is thought to simulate, in accelerated form, the fading which a print might undergo under normal conditions of use. After exposure for the desired time, measurements were made as described with reference to the calender intensity test, and the results were expressed in the same way.

The results of the tests are set out in Tables 1B and 1C below, in which "Delta" designates the difference between the calender intensity after 48 hours dark development and after an additional 30 hours in the fade cabinet, and is thus a measure of the amount of fading which has occurred. In each case I indicates values for a colour developer composition according to the invention and C indicates values for a control admixture composition.

TABLE 1b

| | | Paper A | | | | | | |
|---|---|---|---|---|---|---|---|---|
| % | | C.I. Value | | Fade Data | | | | |
| Composite | | 2 min | 48 hr | 5 hr | 10 hr | 15 hr | 30 hr | Delta |
| 10 | I | 52.0 | 46.4 | 50.8 | 55.2 | 58.7 | 65.7 | 19.3 |
| | C | 80.0 | 72.8 | 76.1 | 81.3 | 84.1 | 87.4 | 14.6 |
| 20 | I | 50.1 | 44.9 | 45.0 | 50.5 | 54.2 | 60.4 | 15.5 |
| | C | 82.2 | 77.5 | 80.2 | 83.1 | 86.5 | 90.4 | 12.9 |
| 30 | I | 48.9 | 43.1 | 43.3 | 49.7 | 53.5 | 59.0 | 15.9 |
| | C | 73.9 | 69.0 | 69.7 | 77.6 | 82.3 | 87.4 | 18.4 |
| 40 | I | 47.5 | 40.8 | 43.3 | 48.9 | 52.8 | 59.5 | 18.7 |
| | C | 69.2 | 64.7 | 67.2 | 74.7 | 79.3 | 85.8 | 21.1 |
| 50 | I | 47.0 | 37.2 | 40.5 | 45.0 | 48.8 | 54.0 | 16.8 |
| | C | 67.0 | 62.8 | 66.7 | 74.8 | 78.8 | 85.8 | 23.0 |

TABLE 1c

| | | Paper B | | | | | | |
|---|---|---|---|---|---|---|---|---|
| % | | C.I. Value | | Fade Data | | | | |
| Composite | | 2 min | 48 hr | 5 hr | 10 hr | 15 hr | 30 hr | Delta |
| 10 | I | 55.0 | 53.7 | 55.7 | 60.7 | 64.2 | 70.4 | 16.7 |
| | C | 78.8 | 74.2 | 78.2 | 84.1 | 85.4 | 89.7 | 15.5 |
| 20 | I | 53.3 | 51.5 | 53.7 | 59.3 | 62.4 | 67.8 | 16.3 |
| | C | 73.3 | 68.9 | 72.4 | 79.5 | 83.3 | 88.0 | 19.1 |
| 30 | I | 52.4 | 50.0 | 53.3 | 58.8 | 62.7 | 68.6 | 18.6 |
| | C | 69.6 | 65.6 | 68.8 | 77.6 | 80.0 | 87.2 | 21.6 |
| 40 | I | 50.6 | 46.9 | 49.6 | 55.5 | 59.8 | 66.2 | 19.3 |
| | C | 69.3 | 65.7 | 68.0 | 74.5 | 79.3 | 88.5 | 22.8 |
| 50 | I | 50.0 | 43.9 | 47.5 | 53.4 | 57.2 | 61.7 | 17.8 |
| | C | 67.2 | 63.7 | 68.4 | 77.4 | 83.0 | 87.7 | 24.0 |

It will be seen that for both Papers A and B, the colour developer composition according to the invention gave a much more intense colouration than the equivalent control admixtures at all levels of composite. At low composite levels, the colour developer composition according to the invention tended to fade more than the control admixture, but this was reversed at composite levels of 30% or more for Paper A and 20% or more for Paper B. Even at low composite levels however, the intensity of print after fading was very much greater for the colour developer composition according to the invention than for the control admixture. In considering the fade data, it should of course be borne in mind that a more intense initial print has an inherently greater potential for fading than an initial print of lower intensity.

EXAMPLE 2

This illustrates the use of hydrothermal treatment at a range of different PH values and time periods in the production of the present colour developer compositions. The process used was generally similar to that of Example 1, except that equal proportions of hydrated silica/hydrated alumina composite and extender pigment (kaolin) were always used. The Example also illustrates a process without any hydrothermal treatment.

760 g of kaolin ("SPS") was slurried with 1777 g water, and the slurry was stirred for 20 minutes to ensure that the kaolin was fully dispersed. 1906 g of 27% aluminium sulphate solution were added, and the mixture was stirred for a further 10 minutes. 3997 g of 20% sodium silicate solution (prepared as in Example 1) were then added slowly over a period of 15 minutes. These quantities were such as to give a hydrated silica/-hydrated alumina composite level of 50%, based on the total weight of composite and kaolin, and an alumina content in the composite of 20%.

It was observed that some precipitation and sol formation occurred as the sodium silicate solution was added, and that the viscosity of the mixture increased significantly. This increase in viscosity did not exceed manageable limits.

The pH of the mixture on completion of the sodium silicate addition was approximately 4. This was then raised by gradual addition of sodium hydroxide solution until a pH of approximately 5 was reached. This resulted in further precipitation and in gelling of the sol.

The resulting mixture was then hydrothermally treated by heating to 100° C. and maintaining this temperature for a total of 4 hours. It was noticed during the hydrothermal treatment stage that the pH tended to drop. Consequently, sodium hydroxide solution was added slowly by means of a low flow peristaltic pump to maintain a pH of 5. During the hydrothermal treatment, samples of the mixture were drawn off at specific intervals (immediately prior to treatment, 30 minutes, 1 hour, 2 hours and 4 hours). The solid material from each stage was filtered off, washed, dried and dry milled, all as described in Example 1. The mean particle size after milling was in the range 2.7 to 3.5 μm in each case, as determined by light scattering particle size analysis. The amount of mixture drawn off at each sampling stage was sufficient to produce 300 g of dry product.

The above-described procedure was then repeated three times, but with the pH during hydrothermal treatment maintained at 6, 7 or 8. Each colour developer composition obtained was evaluated by formulating into a CF coating formulation, coating onto paper and evaluating, all as described in Example 1, except that no fade testing was done. The test paper used was Paper B.

The C.I. values obtained are shown in Table 2 below, in which in each box, the 2 minutes and 48 hour values are in the top left hand and bottom right hand positions respectively.

TABLE 2

The effect of the variation of pH during the hydrothermal treatment (temp 100° C.)

| | | Time (hours) | | | | | | | | | |
|---|---|---|---|---|---|---|---|---|---|---|---|
| | | 0 | | 0.5 | | 1 | | 2 | | 4 | |
| pH | 5 | 39.2 | | 46.1 | | — | | 35.7 | | 33.2 | |
| | | | 39.2 | | 42 | | — | | 34.2 | | 32 |
| | 6 | 35.7 | | 30.2 | | 32.3 | | 31.9 | | 38.2 | |
| | | | 35.3 | | 31.3 | | 34.5 | | 32.7 | | 36.9 |
| | 7 | 40.8 | | 32.2 | | 30.9 | | 32 | | 31.5 | |
| | | | — | | 35.2 | | 33.7 | | — | | 33.6 |
| | 8 | 30.7 | | 30.5 | | 35.5 | | 35.5 | | 31.3 | |
| | | | 32.5 | | 32.4 | | 35.4 | | 36.1 | | 31.1 |

It will be seen that although there are some anomalous results, the duration of hydrothermal treatment required to achieve an excellent C.I. value (i.e. around 30 to 33) diminishes as the pH increases.

EXAMPLE 3

This illustrates the use of hydrothermal treatment at a range of different temperatures and time periods in the production of the present colour developer compositions. The process used was similar to that of Example 2. The Example also illustrates a process without hydrothermal treatment.

A mixture of 50% hydrated silica/hydrated alumina composite and 50% kaolin (20% alumina content in the composite) was prepared using the procedure and quantities described in the first part of Example 2.

It was observed that some precipitation and sol formation occurred as the sodium silicate solution was added, and that the viscosity of the mixture increased significantly. This increase in viscosity did not exceed manageable limits.

The pH of the mixture was adjusted to, and then maintained at, 7 by the procedure described in Example 2, the subsequent steps of which were also repeated, except that instead of repeat runs at different pH values, repeat runs at different hydrothermal treatment temperatures (60° C., 70° C. and 80° C.) were carried out. The mean particle size after milling was in the range 2.7 to 3.5 μm in each case as determined by light scattering particle size analysis.

The C.I. values obtained are shown in Table 3 below, in which in each box, the 2 minute and 48 hour values are in the top left hand and bottom right hand positions respectively.

TABLE 3

The effect of the variation in temperature during hydrothermal treatment (pH 7)

| | | Time (hours) | | | | | | | | | |
|---|---|---|---|---|---|---|---|---|---|---|---|
| | | 0 | | 0.5 | | 1 | | 2 | | 4 | |
| Temp (°C.) | 100 | 40.8 | | 32.2 | | 30.9 | | 32 | | 31.5 | |
| | | | — | | 35.2 | | 33.7 | | — | | 33.6 |
| | 80 | 35.8 | | 35.9 | | 31.6 | | 34.2 | | 33.1 | |
| | | | 36.2 | | 38 | | 34.5 | | 37.1 | | 35.5 |
| | 70 | 39.8 | | 35.8 | | 33.3 | | 36.6 | | 28.3 | |
| | | | 31.2 | | 36 | | 33.4 | | 30.7 | | 27 |
| | 60 | 39.8 | | 39.9 | | 35.2 | | 36.8 | | 35.9 | |
| | | | 31.2 | | 36.7 | | 35.3 | | 37 | | 35 |

It will be seen that although there are some anomalous results, the use of a high temperature (100° C.) required shorter treatment times for the achievement of marked improvements in colour developing performance than did the use of lower temperatures.

EXAMPLE 4

This illustrates the use of calcined clay and talc as alternatives to the kaolin extender pigment used in Example 1. Parallel experiments with kaolin were also carried out for comparative purposes.

Two sets of experiments were run. In the first set, hydrated silica/hydrated alumina composites with three different hydrated alumina levels (10%, 20% and 30%) were used with the same relative proportions of composite and each extender pigment (30% composite/70% extender pigment). In the second set, hydrated silica/hydrated alumina composite with a fixed hydrated alumina content (20%) was used in three different relative proportions with each extender pigment (10%,30% and 50% extender pigment).

The calcined clay used was "Ansilex" supplied by Englehard, the talc was "Mistron" supplied by Cyprus Minerals, and the kaolin was "SPS" as used in previous Examples.

A g of the extender pigment was slurried with B g water, and the slurry was stirred for 20 minutes to ensure that the pigment was fully dispersed. C g of 27% aluminium sulphate solution and D g of 30% sulphuric acid were added, and the mixture was stirred for a further 10 minutes. E g of 20% sodium silicate solution (prepared as in Example 1) were then added slowly over a period of 15 minutes. These quantities were chosen such as to give the desired hydrated silica/hydrated alumina composite levels of 10%, 30% and 50% based on the total weight of composite and extender pigment, and the desired alumina contents in the composite of 10%, 20% and 30%, based on the total weight of hydrated alumina and hydrated silica. The values of A to E are set out below.

| Alumina Level % | Extender Pigment Level % | A | B | C | D | E |
|---|---|---|---|---|---|---|
| 20 | 10 | 300 | 700 | 83 | 0 | 175 |
| 20 | 30 | 231 | 539 | 248 | 0 | 520 |
| 20 | 50 | 165 | 385 | 413 | 0 | 866 |
| 10 | 30 | 231 | 539 | 123 | 44 | 584 |
| 20 | 30 | 231 | 539 | 248 | 0 | 520 |
| 30 | 30 | 231 | 539 | 370 | 0 | 454 |

It was observed that some precipitation and sol formation occurred in each case as the sodium silicate solution was added, and that the viscosity of the mixture increased significantly. This increase in viscosity did not exceed manageable limits. The pH of the mixture on completion of the sodium silicate addition was approximately 4. This was then raised by gradual addition of sodium hydroxide solution until a pH of approximately 7 was reached. This resulted in further precipitation and in gelling of the sol.

The resulting mixture was then hydrothermally treated for 4 hours at 100° C. and pH 7, as described in Example 2. The remaining procedure was also as described in Example 2. The median particle size, residual moisture content and B.E.T. surface area characteristics of each set of the resulting products were measured and are detailed in Tables 4(*a*) and 4(*b*) below respectively.

TABLE 4(a)

| Extender Pigment | % $Al_2O_3$ | Particle Size (μm) | % Moisture | Surface area ($m^2g^{-1}$) |
|---|---|---|---|---|
| Kaolin | 10 | 3.24 | 4 | 178 |
| | 20 | 2.79 | 4 | 119 |
| | 30 | 2.54 | 6 | 167 |
| Talc | 10 | 3.78 | 4.5 | 223 |
| | 20 | 3.68 | 3 | 183 |
| | 30 | 2.97 | 7 | 188 |
| Calcined Clay | 10 | 2.74 | 5 | 215 |
| | 20 | 2.18 | 5.4 | 141.7 |
| | 30 | 2.28 | 3 | 124.8 |

TABLE 4(b)

| Extender Pigment | % $Al_2O_3$ | Particle Size (μm) | % Moisture | Surface area ($m^2g^{-1}$) |
|---|---|---|---|---|
| Kaolin | 10 | 2.5 | 5 | 61 |
| | 30 | 2.79 | 4 | 119 |
| | 50 | 3.01 | 7 | 257 |
| Talc | 10 | 2.9 | 1.6 | 89 |
| | 30 | 3.68 | 3 | 183 |
| | 50 | 3.27 | 5 | 253 |
| Calcined Clay | 10 | 2 | 2.2 | 66.9 |
| | 30 | 2.18 | 5.4 | 141.7 |
| | 50 | 2.5 | 9 | 271.9 |

Each colour developer composition obtained was evaluated as described in Example 1.

The results for the first and second sets of experiments are shown in Tables 4(*c*) and 4(*d*) below respectively.

TABLE 4(c)

| Extender Pigment | % $Al_2O_3$ | CI 2 min | CI 48 hour | Fade 5 hour | Fade 10 hour | Fade 15 hour | Fade 30 hour |
|---|---|---|---|---|---|---|---|
| Kaolin | 10 | 55.5 | 54.1 | 59.1 | 62.6 | 66.7 | 72.7 |
| | 20 | 53.2 | 52.4 | 53.7 | 57.5 | 60.6 | 68.3 |
| | 30 | 51.7 | 50 | 53.7 | 57.9 | 62.6 | 69 |
| Talc | 10 | 57.5 | 51.5 | 64.1 | 68.5 | 73.6 | 80.2 |
| | 20 | 48.1 | 44.4 | 51.3 | 56.8 | 60.6 | 69.9 |
| | 30 | 63 | 57.7 | 65.3 | 70 | 75 | 81.8 |
| Calcined Clay | 10 | 53.7 | 50.6 | 56.5 | 60.7 | 64.2 | 69.8 |
| | 20 | 48.1 | 41 | 50.6 | 56.7 | 61.1 | 70.9 |
| | 30 | 57.7 | 53.7 | 62.9 | 67.2 | 70.6 | 75.1 |

TABLE 4(d)

| Extender Pigment | % $Al_2O_3$ | CI 2 min | CI 48 hour | Fade 5 hour | Fade 10 hour | Fade 15 hour | Fade 30 hour |
|---|---|---|---|---|---|---|---|
| Kaolin | 10 | 64.8 | 60.9 | 65.9 | 70.7 | 73.7 | 81 |
| | 30 | 53.2 | 52.4 | 53.7 | 57.5 | 60.6 | 68.3 |
| | 50 | 50.9 | 49 | 53.5 | 59.2 | 62.9 | 73 |
| Talc | 10 | 52.5 | 43.2 | 59.8 | 65.3 | 69 | 75.7 |
| | 30 | 48.1 | 44.4 | 51.3 | 56.8 | 60.6 | 69.9 |
| | 50 | 45.1 | 39 | 46.7 | 53.7 | 58 | 67.4 |
| Calcined Clay | 10 | 72 | 65.8 | 72 | 76.9 | 80 | 87 |
| | 30 | 48.1 | 41 | 50.6 | 56.7 | 61.1 | 70.9 |
| | 50 | 45.1 | 37.1 | 46.1 | 52.9 | 57.3 | 65.8 |

It will be seen from Table 4(*d*) that although there are some anomalous results, the use of talc and calcined clay generally gave better initial image intensity but worst fading performance than kaolin (at a fixed 20% hydrated alumina content in the hydrated silica/hydrated alumina composite). At a fixed proportion of composite relative to extender pigment (Table 4(*c*)), talc and calcined clay gave better initial intensity than kaolin at 10% and 20% hydrated alumina levels in the composite, but at 30% hydrated alumina, kaolin was better. Kaolin consistently gave better fading performance than either talc or calcined clay.

EXAMPLE 5

This illustrates the modification of the hydrated silica/hydrated alumina composite by the inclusion of a small proportion of other hydrated metal oxides.

The procedure employed was as in Example 2 up to the stage of dry milling with a pH of 7 during hydrothermal treatment.

250 g portions of the milled dried product were each reslurried with 375 g water. 6.6 g of nickel sulphate $NiSO_4.6H_2O$, were added to one stirred slurry, 8.1 g of zirconium oxychloride, $ZrOCl_2.8H_2O$, to another and 6.2 g of copper sulphate, $CuSO_4.5H_2O$, to the third. In each case, the metal salt was allowed to dissolve. After approximately 10 minutes, the slurry was readjusted to a pH of 7 by the addition of sodium hydroxide. The slurry was then filtered, washed, dried and milled using a fluid energy mill to a median particle size in the range 2 to 4 μm. The weight of metal salt added was such that each sample contained a similar level of metal ion on a molar basis (this level was 1% mol wt/wt, based on the total weight of the composite).

The median particle size, residual moisture content and B.E.T. surface area characteristics of the samples were measured and are detailed in Table 5(*a*) below, together with values for a composite with no metal modification.

TABLE 5(a)

| Metal | Particle Size (μm) | % Moisture | Surface area ($m^2g^{-1}$) |
|---|---|---|---|
| Nickel | 2.62 | 5 | 221 |
| Copper | 3.33 | 3.3 | 240 |
| Zirconium | 2.77 | 4.1 | 249 |
| None | 2.75 | 6 | 248 |

Each colour developer composition obtained was evaluated by formulating into a CF coating formulation, coating onto paper and evaluating, all as described in Example 1.

The C.I. and fade values obtained are shown in Table 5(*b*) below.

TABLE 5(b)

| | CI | | Fade | | | |
|---|---|---|---|---|---|---|
| Metal | 2 min | 48 hour | 5 hour | 10 hour | 15 hour | 30 hour |
| Nickel | 50 | 49.8 | 51.6 | 55.6 | 59.1 | 64 |
| Copper | 50.5 | 49.3 | 51.6 | 56.2 | 60 | 64.5 |
| Zirconium | 50.8 | 50 | 53 | 58.1 | 62 | 67.1 |
| Zone | 49 | 50.6 | 53.4 | 58.7 | 63 | 68 |

It will be seen that nickel and copper modification was effective to enhance fade performance, but that zirconium modification had little effect.

I claim:

1. A process for the production of a colour developer composition comprising both a hydrated silica/hydrated alumina composite in which hydrated silica predominates and an inorganic pigment extender, said process comprising the steps of:

a) gradually adding a metal silicate solution to a solution of an aluminum salt which is initially at a pH below 4 until the pH of the resulting mixture is approximately 4, thereby to induce some precipitation and to form a sol;

b) gradually adding alkali to said sol to raise the pH to approximately 7, thereby to induce further precipitation and gel the sol or further gel the sol, said gelled sol being a hydrated silica/hydrated alumina composite;

c) separating the resulting product from the aqueous medium and washing to remove dissolved salts; and d) drying the washed product and reducing it in particle size;

wherein said process the inorganic pigment extender is present during precipitation of the hydrated silica/hydrated alumina composite from the metal silicate and aluminum salt precursor solutions and forms part of the product which is subsequently separated, washed, dried and reduced in particle size.

2. A process as claimed in claim 1, wherein the gelled sol/extender mixture produced in step (b) of the process is subjected to a hydrothermal treatment before being separated and washed as specified in step (c) of the process.

3. A process as claimed in claim 2, wherein the hydrothermal treatment is carried out at 100° C. for up to five hours.

4. A process as claimed in claim 1 wherein the residual moisture content of the colour developer composition after drying in step (d) of the process is up to 10% by weight.

5. A process as claimed in claim 1 wherein the median particle size of the colour developer composition after reduction in particle size in step (d) of the process is in the range 2 to 4 μm, as measured by a laser light scattering particle size analyser.

6. A process as claimed in claim 1 wherein the B.E.T. surface area of the colour developer composition after drying and reduction in particle size in step (d) of the process is up to 300 $m^2\ g^{-1}$.

7. A process as claimed in claim 1 wherein a small proportion of a hydrated metal oxide (other than hydrated alumina) is incorporated in the hydrated silica/hydrated alumina composite by precipitation on to the composite after the composite has been formed or by co-precipitation during formation of the composite.

8. Record material comprising a colour developer composition produced by a process as claimed in claim 1.

9. A process as claimed in claim 2, wherein the hydrothermal treatment is carried out at 100° C. for up to four hours.

10. A process as claimed in claim 3, wherein the residual moisture content of the colour developer composition after drying in step (d) of the process is up to 10% by weight.

11. A process as claimed in claim 3, wherein the median particle size of the colour developer composition after reduction in particle size in step (d) of the process is in the range 2 to 4 μm, as measured by a laser light scattering particle size analyser.

12. A process as claimed in claim 3, wherein the B.E.T. surface area of the colour developer composition after drying and reduction in particle size in step (d) of the process is up to 300 $m^2\ g^{-1}$.

13. A process as claimed in claim 3, wherein a small proportion of a hydrated metal oxide (other than hydrated alumina) is incorporated in the hydrated silica/hydrated alumina composite by precipitation on to the composite after the composite has been formed or by co-precipitation during formation of the composite.

14. Record material comprising a colour developer composition produced by a process as claimed in claim 3.

15. Record material comprising a colour developer composition produced by a process as claimed in claim 4.

16. Record material comprising a colour developer composition produced by a process as claimed in claim 5.

17. Record material comprising a colour developer composition produced by a process as claimed in claim 6.

18. Record material comprising a colour developer composition produced by a process as claimed in claim 7.

* * * * *